US009684470B2

United States Patent
Markley et al.

(10) Patent No.: US 9,684,470 B2
(45) Date of Patent: Jun. 20, 2017

(54) RAPID MIGRATION TO MANAGED CLOUDS WITH MULTIPLE CHANGE WINDOWS

(71) Applicant: International Business Machines Corporation, Armonk, NY (US)

(72) Inventors: Matthew A. Markley, Hays, KS (US); Erick E. Perales, Rockwall, TX (US); Birgit M. Pfitzmann, Samstagern (CH); Marcel Schlatter, Neuhausen am Rheinfall (CH); Gerhard Widmayer, Herrenberg (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 323 days.

(21) Appl. No.: 14/503,334

(22) Filed: Sep. 30, 2014

(65) Prior Publication Data

US 2016/0092127 A1    Mar. 31, 2016

(51) Int. Cl.
*G06F 9/455*    (2006.01)
*G06F 3/06*    (2006.01)

(52) U.S. Cl.
CPC ............ *G06F 3/0647* (2013.01); *G06F 3/065* (2013.01); *G06F 3/067* (2013.01); *G06F 3/0617* (2013.01); *G06F 3/0665* (2013.01); *G06F 9/45541* (2013.01); *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,644,300 | B1 * | 1/2010 | Rao ................. G06F 11/1435 714/15 |
| 7,805,721 | B2 | 9/2010 | Feinleib |
| 8,127,289 | B2 | 2/2012 | Craft |
| 2012/0054731 | A1 | 3/2012 | Aravamudan |
| 2012/0072709 | A1 | 3/2012 | Joukov |
| 2012/0131567 | A1 | 5/2012 | Barros |
| 2012/0259909 | A1 | 10/2012 | Bachelor |
| 2012/0304179 | A1 | 11/2012 | Devarakonda |
| 2012/0311568 | A1 | 12/2012 | Jansen |

(Continued)

OTHER PUBLICATIONS

Huang et al.; "Patch Management Automation for Enterprise Cloud", IBM Tj Watson Research Center, NOMS Application Track, 2012, pp. 1-15.

(Continued)

*Primary Examiner* — Kenneth Tang
(74) *Attorney, Agent, or Firm* — Louis J. Percello; Otterstedt, Ellenbogen & Kammer, LLP

(57) ABSTRACT

An image version of a source instance is prepared and is transferred to a destination environment. Two or more copies of the transferred image version of the source instance are created at the destination environment. The first copy of the transferred image version of the source instance is adjusted while the source instance is in use. The second copy of the transferred image version of the source instance is resynchronized with one or more changes made to the source instance. The adjustments made to the first copy of the source instance are applied to the resynchronized second copy of the source instance.

6 Claims, 11 Drawing Sheets

(56) References Cited

U.S. PATENT DOCUMENTS

| | | |
|---|---|---|
| 2013/0007216 A1 | 1/2013 | Fries |
| 2013/0054734 A1 | 2/2013 | Bond |
| 2014/0082131 A1* | 3/2014 | Jagtap .................. G06F 9/5072 709/217 |
| 2014/0146055 A1 | 5/2014 | Bala |
| 2014/0149492 A1* | 5/2014 | Ananthanarayanan G06F 9/5072 709/203 |
| 2014/0149494 A1 | 5/2014 | Markley |
| 2014/0149591 A1 | 5/2014 | Bhattacharya |
| 2014/0149983 A1 | 5/2014 | Bonilla |

OTHER PUBLICATIONS

Zhou Liang; "CloudFTP: A Case Study of Migrating Traditional Applications to the Cloud", ISDEA/IEEE 3rd International Conference on, Jan. 16-18, 2013, pp. 436-440.

Peter Mell and Tim Grace, The NIST Definition of Cloud Computing Version 15, Oct. 7, 2009.

* cited by examiner

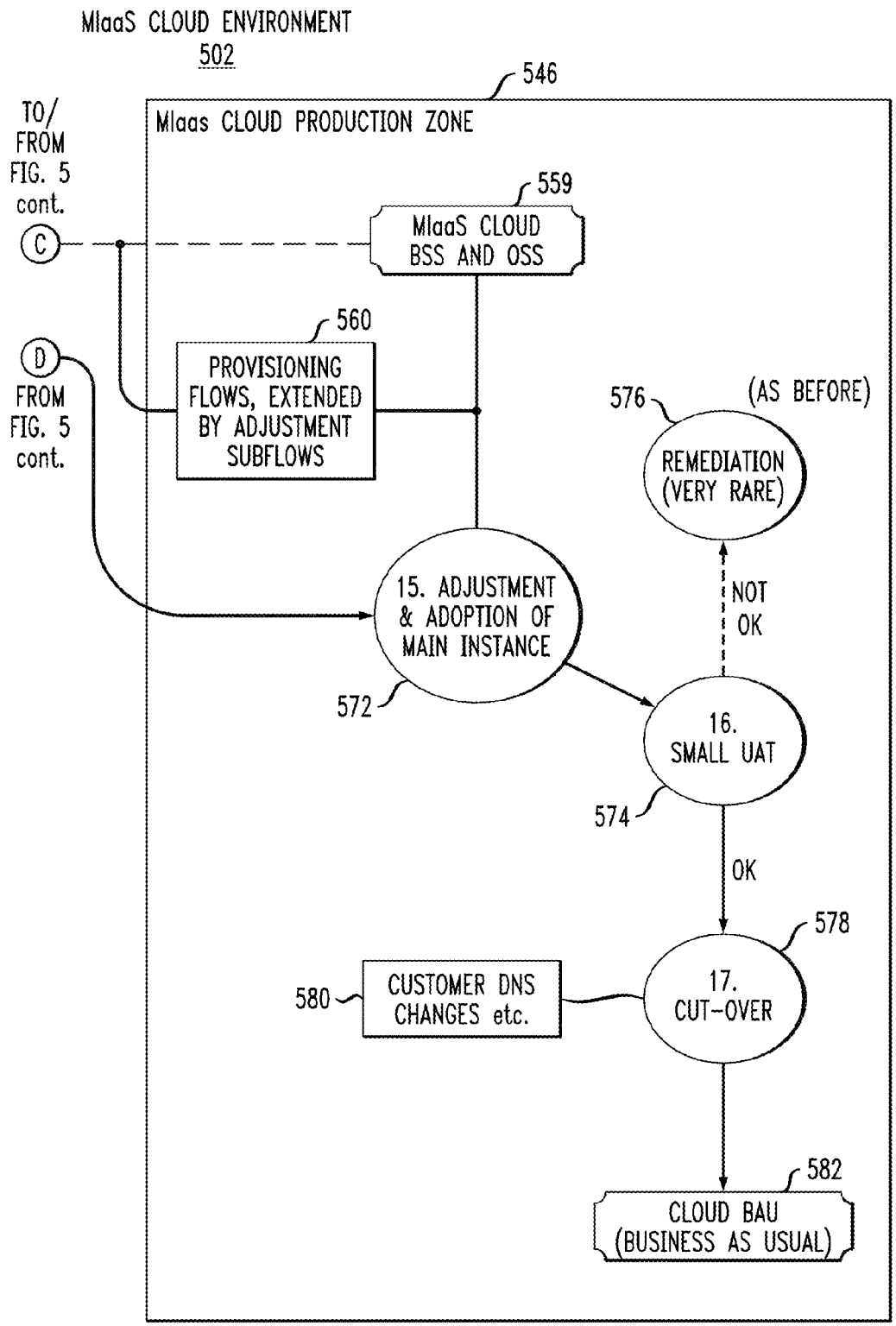
FIG. 5 cont.(1)

RAPID MIGRATION TO MANAGED CLOUDS WITH MULTIPLE CHANGE WINDOWS

FIELD OF THE INVENTION

The present invention relates to the electrical, electronic and computer arts, and, more particularly, to cloud computing and the like.

BACKGROUND OF THE INVENTION

In an Infrastructure as a Service (IaaS) cloud, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage selection, deployed applications, and possibly limited control of select networking components (e.g., host firewalls). IaaS clouds primarily offer their users virtual machines (VMs), rather than also software on the VMs (Paas, platform-as-a-service) or even software without access to the VMs (Software-as-a-Service) or business processes (BPaaS).

A Hardware-Infrastructure-as-a-Service (HIaaS) cloud is a sub-division of an IaaS cloud, and provides bare-bones virtual machines as a service. It may also provide an operating system (OS), and even software, but no support is typically provided for the OS or software (e.g., Amazon Elastic Compute Cloud (EC2)). A Managed-Infrastructure-as-a-Service (MIaaS) cloud is a sub-division of an IaaS cloud, and provides full-service virtual machines. The service may, e.g., include OS patching and support for security and compliance of the OS (e.g., IBM SmartCloud Enterprise+ (SCE+) or IBM Cloud Managed Services service available from International Business Machines Corporation, Armonk, N.Y., USA).

SUMMARY OF THE INVENTION

Principles of the invention provide techniques for rapid migration to managed clouds with multiple change windows. In one aspect, an exemplary method includes the steps of preparing an image version of a source instance; transferring the image version of the source instance to a destination environment; creating two or more copies of the transferred image version of the source instance at the destination environment; adjusting the first copy of the transferred image version of the source instance while the source instance is in use; resynchronizing the second copy of the transferred image version of the source instance with one or more changes made to the source instance; and applying the adjustments made to the first copy of the source instance to the resynchronized second copy of the source instance.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide a migration technique with one or more of the following advantages:

- Short change windows, in particular short down-time (e.g., decreasing unusable time of the source instance);
- Ability to perform migration with less rush, and therefore better tests, better reliability;
- Also because of less rush, one may be able to afford more adjustments than otherwise, and thus closer adherence to cloud standards, which is helpful in steady-state management later;
- No need to assume that no application data or application-related configurations are on the boot drive;
- At least some of the migration processes can be executed during times with more available resources (e.g., mid-week), as opposed to doing the whole migration during a single change window, which is typically on the weekend to avoid taking the source instance out of service during peak use times, thereby more efficiently using resources.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
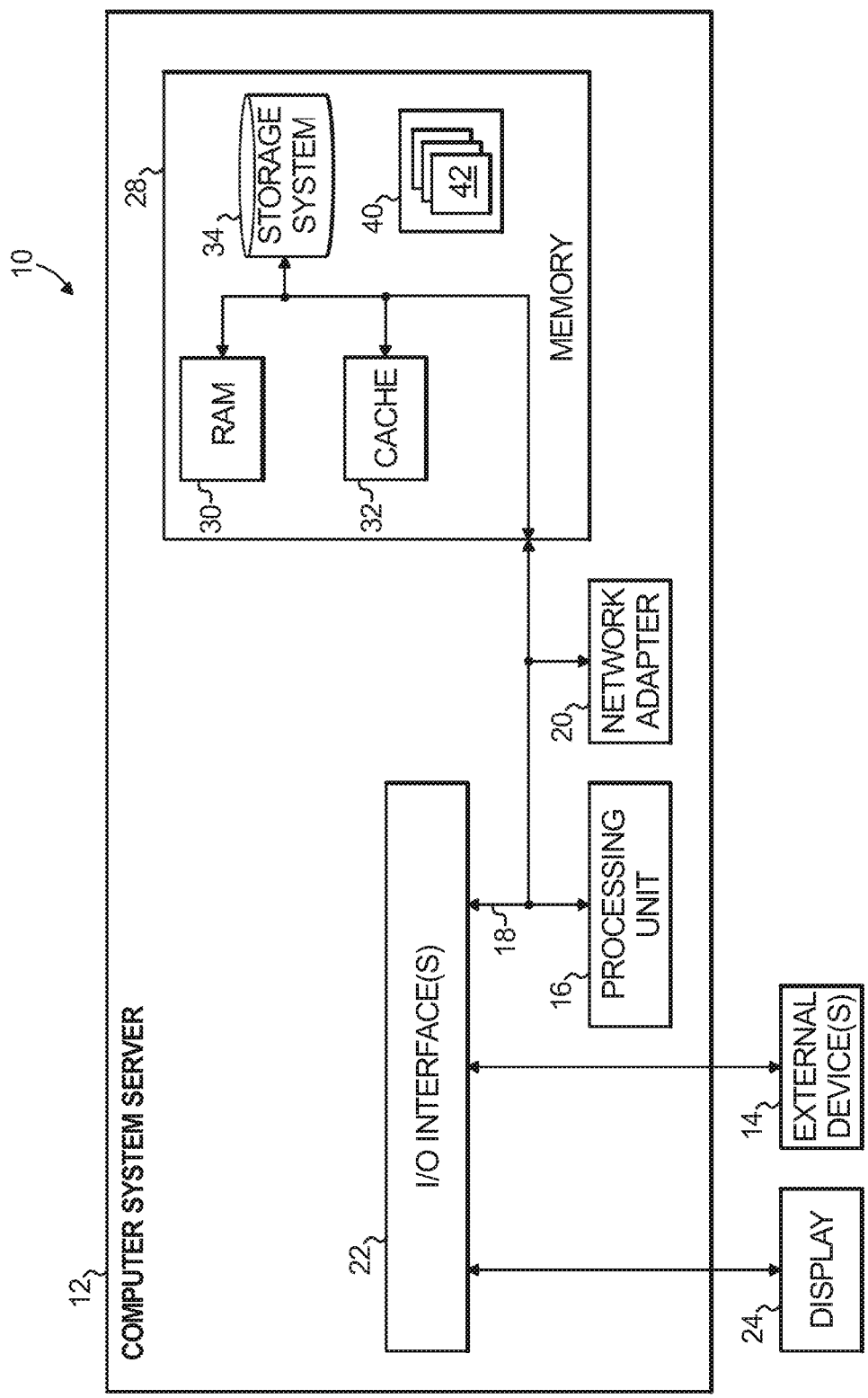
FIG. 1 depicts a cloud computing node according to an embodiment of the present invention.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
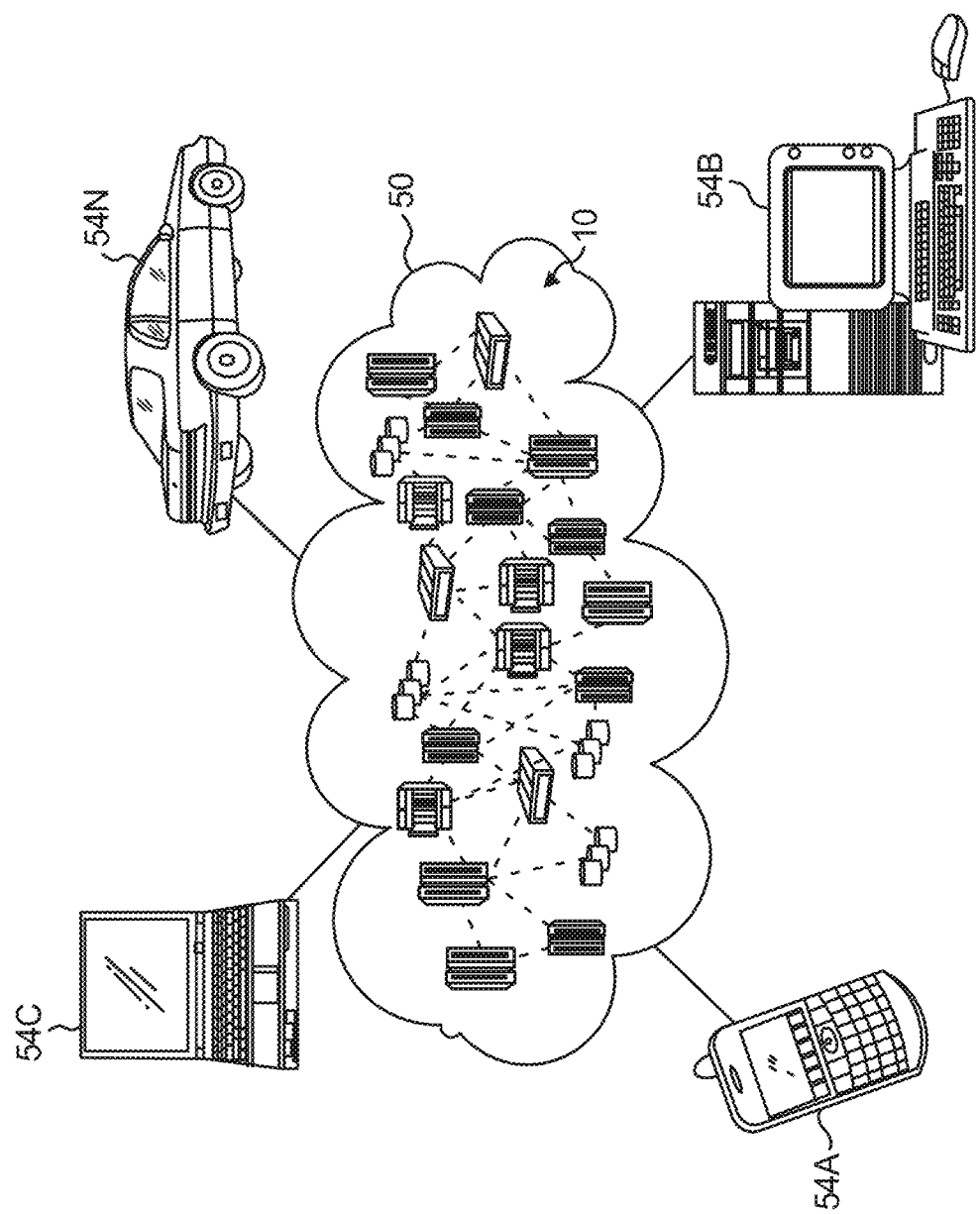
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
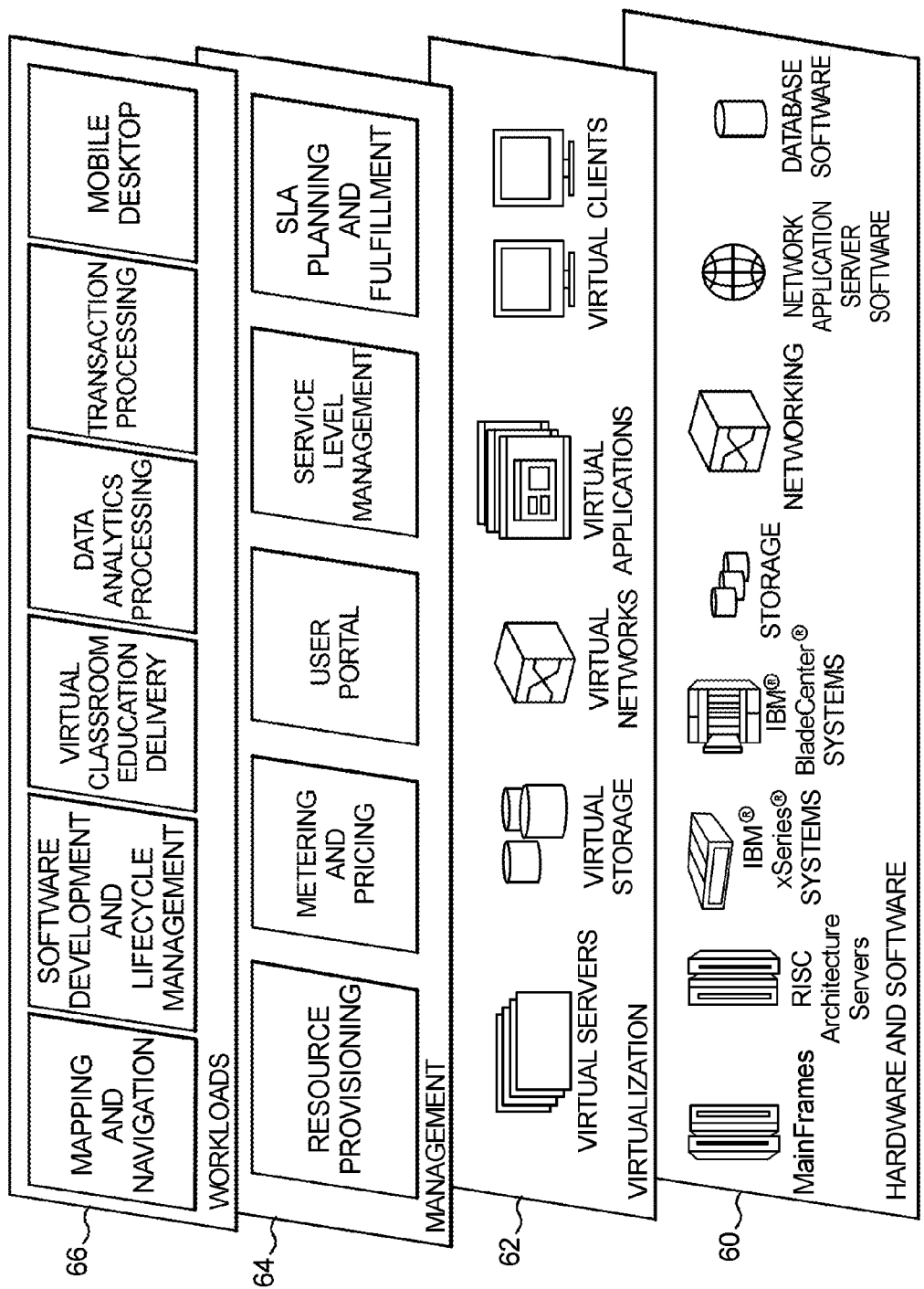
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As used herein, the following terms will have the described meaning:

An "instance" is an operating system instance together with all software running on this operating system. It may be physical (i.e., directly running on a server) or virtual (i.e., already running on a hypervisor).

A "source instance" is an instance as it is running on the source side, before migration.

An "image" is a file representation of an instance.

A "catalog image" is an image in a cloud catalog, to be used if new instances are created in the cloud from scratch, rather than by rapid migration.

"Provisioning" is the standard mechanism of ordering virtual machine (VM) instances in an IaaS cloud. The user orders a VM from the catalog, and the corresponding actual catalog image is instantiated into a running instance.

A "reinstall migration" is, from the point of view of an MIaaS cloud, the standard way of moving an application into the cloud The first step is to provision a catalog image, and then to reinstall necessary software components, source code, configurations, and the data into the running instance that resulted from provisioning the catalog image. This is typically a time-consuming and costly process.

An "image-based migration" is a migration that uses customer instances for migration of the application to the cloud. While in classic virtualization, image-based migration is a standard (physical-to-virtual (P2V) or virtual-to-virtual (V2V)), and can be very fast, with MIaaS clouds, image-based migration is typically a challenge because the image generated directly from the source instance does not enable the management part of the MIaaS cloud. In migrating to an MIaaS cloud, it is typically not feasible to simply use P2V conversion on source instances, or to directly copy already virtualized instances (V2V), and then expect them to be run on cloud hypervisors. This is so because they would not fulfill criteria through which simpler management is achieved in the MIaaS cloud, and thus they would not be acceptable to the management of the MIaaS cloud.

"Rapid Migration to an MIaaS cloud" is an extension of image-based migration that can handle the challenges of an MIaaS cloud.

Rapid migration is a method to migrate source instances, i.e. physical or virtual servers, to MIaaS (and pure IaaS) clouds (e.g., IBM SMART CLOUD ENTERPRISE PLUS (SCE+) available from International Business Machines Corporation, Armonk, N.Y., USA), or other target information technology (IT) environments with standardization. The method includes transfer of the instance to the cloud in image form; adjustments of the instance (running or in image form) to cloud standards; and registration of the instance into cloud OSS and BSS systems (Operation and Business Support Systems). Typical rapid migration has a change window opened at the beginning of the rapid migration process. A change window (e.g., permitted downtime) is a period of time defined by one or more configuration items (CI), which specifies when the CI can be taken out of service for changes to be made. A configuration item is any component of an IT infrastructure that is under the control of configuration management; in the present example, the CI in question is the source instance. During the change window, the applications running on the source instance to be migrated are typically shut down on the source side, and are only brought back up for real use on the target side when adjustments, registration and tests are finished. Often the start of the adjustment stage of the migration process is the latest time in which the application can be shut down, even if one already uses a method for transferring the image from the source site to the target site that allows resynchronization, i.e., changes during the transfer period can be transferred at the end. Without such a method the application needs to be already shut down when the transfer starts.

In some instances, change windows (e.g., permitted downtime) are so short that even rapid migration cannot be completed in one change window. For example, some users wanting to use cloud services have short change windows at least for some important applications that cannot be "off" for a long period of time, and/or have complex source instances that cannot always be migrated within those change windows. Examples may be an online purchase website where the owner does not want to lose the sales during a weekend of downtime, or a travel information site, or an internal monitoring system that is needed to survey the rest of the IT environment of an enterprise. While short change windows may also be a problem for non-cloud migration, due to the adjustment and registration stages of rapid migration, this problem is increased in clouds. Additionally, in some instances, adjustments lead to a larger likelihood of an application failure after migration, and therefore, more tests may be done on the application to ensure success, and with more adjustments, the possibility of having to remediate the instance is larger. All these tests and remediations cost additional time that needs to be accounted for in the length of the change window.

As such, it is important to have well-defined workflows for rapid migration to facilitate migration during the allotted time, and account for remediation of the instances and back-out, i.e., how to switch back to the source instances if the migration did not succeed within the planned change window. To that end, a standardized infrastructure and management thereof is desirable. Standardization, and automation, may also reduce the IT running costs as compared to the IT investment costs. Underlying data migration tools exist that start transferring data in the background, while the source instance is running, and resynchronize it later, i.e., they keep track of what changes on the source instance while the transfer is going on, and after the first complete transfer they send these changes, and apply these also to the transferred data at the target. Hence the source instance only needs to be shut down when the major transfer has been done, and only very last changes need to be still transferred, but these tools are not applicable (at least not alone) for use with MIaaS as they do not account for the adjustments that occur with MIaaS.

One or more embodiments provide a system, apparatus, method and/or a computer program product for addressing rapid migration to managed clouds (e.g., MIaaS clouds). This is achieved, in some embodiments, with a novel methodology of providing two or more change windows that are relatively short and are separated by an intermediate period. Two or more change windows can be used in one or more embodiments; however, typically, only two are needed. One significant aspect in one or more embodiments is that it is not required to keep one change window open during the entire migration time. The use of two short change windows allows for the common case, often with rapid migration to MIaaS clouds, where there is no simple separation between operating system data and other data on the source instance, which, with a single change window would otherwise cause the migration to be incomplete.

Regarding the aforementioned "common case," this refers to a case distinction where the "other case" would allow an easier solution. This "other case" is one wherein the operating system data are on one disk (e.g., C:/ in Windows), and the other data (in particular application data) are on another disk (e.g., E:/ in Windows), or otherwise well separated, and where the application owner can confirm that during normal usage of the source instance, only the "other data" change. Then one can do the adjustments (which all concern the operating system) on the one disk, while still resynchronizing the other data on the other disk. Unfortunately, very few application owners in real enterprises are sure that they have such a separation. Thus, the "common case" described above is indeed common. (Whether the case occurs has nothing to do, in and of itself, with whether a migration is planned to be rapid or to MIaaS clouds—however, if such a rapid migration to MIaaS is undertaken, it makes a difference).

The aforementioned two or more change windows are short, but allow for all work that might affect production to be concentrated therein, and are separated by the intermediate period, during which time migration work in a non-production environment is executed. As used herein, "longer period" refers to a period of time that is longer than either individual change window. The intermediate period will typically be longer than the change windows, but this is not a limitation. For example, the first change window may be on a first weekend, then migration work in the non-production environment during one or more weeks, while production continues on the source system. Then, on another weekend, the second change window occurs. As a rule, one could say that one wouldn't do two change windows if the intermediate period for production work isn't worth it (e.g., telling people that the catalog is back online, and then again that it's gone now for a little time). In some embodiments, although it is possible to work with one change window, using at least two change windows and an intermediate (typically but not necessarily longer) time period provides for the migration to be performed in a less rushed manner and thereby allows for one or more of better and/or increased testing and remediation, better reliability, and more complex adjustments than could otherwise be afforded with one change window. For example, with two windows, a more comprehensive test and remediation for operating system changes or updates of security settings can be executed as compared to what can be executed with one change window. Further, using at least two change windows with an intermediate period, per one or more embodiments, means that one change window does not need to be open during the entire migration time, thereby decreasing unusable time of the source instance. Another benefit of using at least two change windows with an intermediate period, per one or more embodiments, is that some of the migration processes can be executed during times with more available resources (e.g., mid-week), as opposed to doing the whole migration during a single change window, which is typically on the weekend to avoid taking the source instance out of service during peak use times, thereby more efficiently using resources.

The methodology includes, in one or more embodiments, providing at least two copies of a transferred source instance in the cloud. The first copy is used for a first round of applying and testing adjustments. Some embodiments include clear documentation and/or additional automation of the choices and manual steps made in the adjustment of this instance. The second copy is retained unchanged while the first copy is adjusted, and is used for resynchronization with the actual running source instance. Then, in the second change window, the tested and streamlined adjustments made to the first copy are applied to the second copy that has been resynchronized with the actual running source instance.

The skilled artisan will be familiar with migration to managed clouds from US Patent Publication 2014-0149591 of Bhattacharya et al.; nevertheless, the complete disclosure of same is expressly incorporated herein by reference in its entirety for all purposes. FIGS. 9 and 10 of the Bhattacharya '591 publication depict alternative migration approaches (rapid migration versus re-installation); the skilled artisan will thus appreciate why rapid migration is appropriate in some instances. FIG. 15 of the Bhattacharya '591 publication depicts an exemplary overview of adjustments in a provisioning flow.

In some embodiments, where the operating system (OS) data and other data are separated (e.g., OS data on the C: drive, other data on the D drive), and a longer change freeze for the OS is possible, a simpler technique can be used where only the data are resynchronized and thus no test copy is needed. Please note that a "change freeze" refers to a period of time during which no modifications are permitted. Refer to the above discussion of cases wherein there is separation between operating system data and other data.

Figure 4:
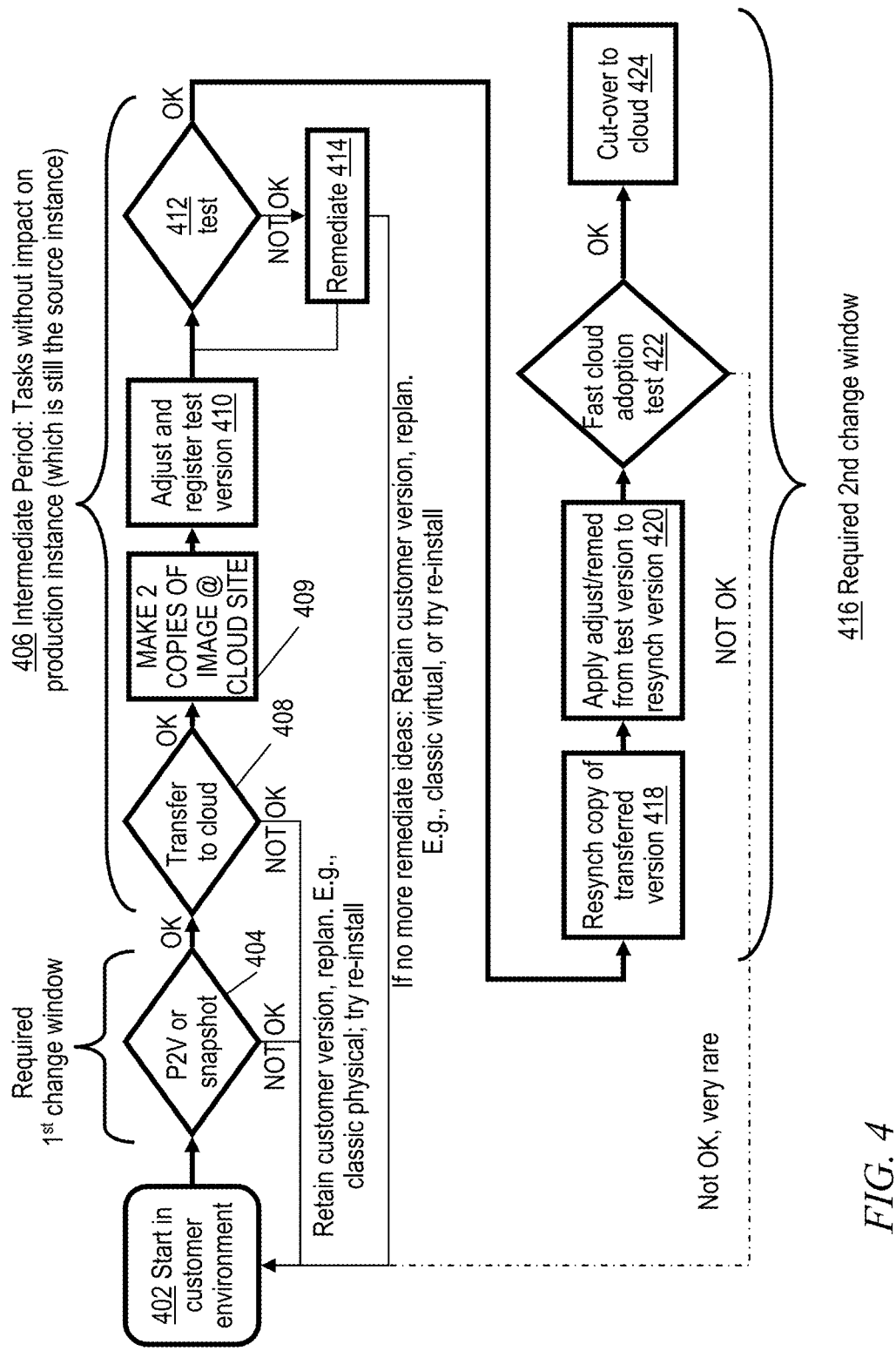
FIG. 4 presents a high-level flow chart, according to an aspect of the invention.

Referring now to FIG. 4, begin with an existing customer environment 402 from which it is desired to migrate. In step 404, during a first change window, a source instance is shutdown, and a virtual copy of the physical instance is made (P2Ved), or, if the source instance is already virtual, the source instance can be directly copied (snapshot). In one or more embodiments, the source instance can immediately continue to be used (e.g., can continue to be used after step 404). In some embodiments, the P2V or snapshotting is a "warm" P2V or snapshotting (i.e. it happens without shutdown of the source instance), and the first change window may be without actual downtime. However, in some instances, this may involve greater risk; this fact can be taken into account by the skilled artisan, given the teachings herein, to determine whether to proceed with or without shutdown—less risk with shutdown, less downtime without shutdown.

The resulting image (from the P2V process or snapshot) is transferred to the cloud site. Two copies of the resulting image are made at the cloud site. On the first copy, adjustments are tried out. The second copy remains intact for resynchronization.

The intermediate period begins in step 406, during which time tasks (e.g., steps 408, 409, 410, 412) without impact on the production instance (which is still the source instance) are executed. One of the benefits of step 406 is that as these tasks can be executed without affecting production, these tasks can be executed with high reliability. The instance transfers to the cloud in image form in step 408. If problems exist with either step 404 or 408 such that the physical instance cannot be converted to a virtual image or transfer of the instance to the cloud is unsuccessful, retain the original customer version 402 and re-plan the migration; for example, via a classical physical approach (i.e., the source instance is not transferred to the cloud, but managed as a physical server). An alternative is to use reinstall migration, with changes in the applications that enable the virtualization.

In one or more embodiments, two or more copies of resulting virtual images of the source instance are made at the cloud site. In step 410, carry out adjustments of the instance (in running and/or in image form) on the first (test) copy to ensure that it complies with cloud standards. If this is not successful, retain the original customer version 402 and re-plan the migration; for example, via a classical virtual approach (i.e., the source instance is not transferred to the cloud, but managed as a virtual server in a different way), or by re-install migration. Then carry out registration of the adjusted test version into the cloud OSS and BSS systems. The order of registration and adjustment might also be different, but then if the adjustments don't succeed, one has to un-register again.

During this time, the second copy remains intact for resynchronization, to be described later with respect to step 418. In step 412, carry out testing. Such testing can include, for example, executing the cloud adoption test whereby the adjustments on the first copy are tested to determine whether the adjusted copy complies with cloud requirements. Such testing can also include, for example, an application test, i.e., whether applications on this instance are still OK after the adjustments. If this is not successful, remediate the first copy in step 414. If remediation is unavailable or not successful, retain the original customer version 402 and re-plan the migration; for example, via a classical virtual approach, or reinstall migration. Once the adjustments on the first copy have been performed and tested successfully, and potential remediation needs on the application have been determined and applied, the method proceeds to step 416, and a second change window begins, during which time tasks (e.g., steps 418, 420, 422 and 424) are executed. In step 418 the second copy is resynchronized with the source instance. During this resynchronization, the second copy is updated with any changes made to the source instance by the application's user, for example, during the time between when the first change window ended and the second change window opened or began. The resynchronization may actually be a continuous process between the source instance and the second copy, so that only very little final data transfer is needed when the source instance is shut down. Then, in step 420, the adjustments, remediation, and registration made to the first copy are applied to the resynchronized second copy. Collectively, we call this cloud adoption. In some embodiments, applying the adjustments and remediation to the second copy is faster than applying the same adjustments and remediation to the first copy. One or more of the following conditions make the adjustments and remediation application to the second copy faster than to the first copy, in some embodiments: the adjustments to the first copy were not completely predetermined or automated; actual debugging and manual remediation were needed with the first copy; reliance is largely on the first test, i.e., it is believed that the same adjustments, applied to the resynchronized image will again be successful.

In step 422, a fast cloud adoption test is executed, or even no test at all (i.e., step 422 can be skipped in some instances). If unsuccessful, retain the original customer version 402 and re-plan the migration. However, this case is very rare because the same or even more tests were already made on the test version. In step 424, the second copy that has been adopted to the cloud, i.e., resynchronized, adjusted and (if necessary) remediated, and registered, is cut-over to the cloud production zone, and the result is successful migration to the MIaaS cloud. As used herein, "cut-over" means that this instance becomes the production instance. In particular, network traffic is now routed to this instance instead of the source instance (if the IP address did not change) or DNS, the Domain Name System, is updated to give user software that uses a domain name the new IP address (if the IP address changed).

In one or more embodiments, if the source instance is already virtual and snapshotting is allowed without a change window, the first change window is not needed. In these instances, the first and second copies of the source instance are still provided, and the method proceeds as described above with respect to FIG. 4.

In some embodiments, a third copy of the source instance is made at the cloud site, and this third copy is, after minimal testing, available to run in the production zone at the cloud site and to replace the source instance (i.e., cut-over), but not inside the MIaaS part. Then, after adjustments are made to the second copy, as described above with respect to FIG. 4, the second copy is cut-over to the cloud production zone for use, and the third copy is deactivated.

In one or more embodiments, if the first change window is relatively large (e.g., an entire weekend), where P2V is complete before the end of the first change window, and the cloud adoption test is ready and successful (i.e., no remediation needed) with enough time before the end of the first change window, the entire migration can be completed in the first change window.

Figure 5:
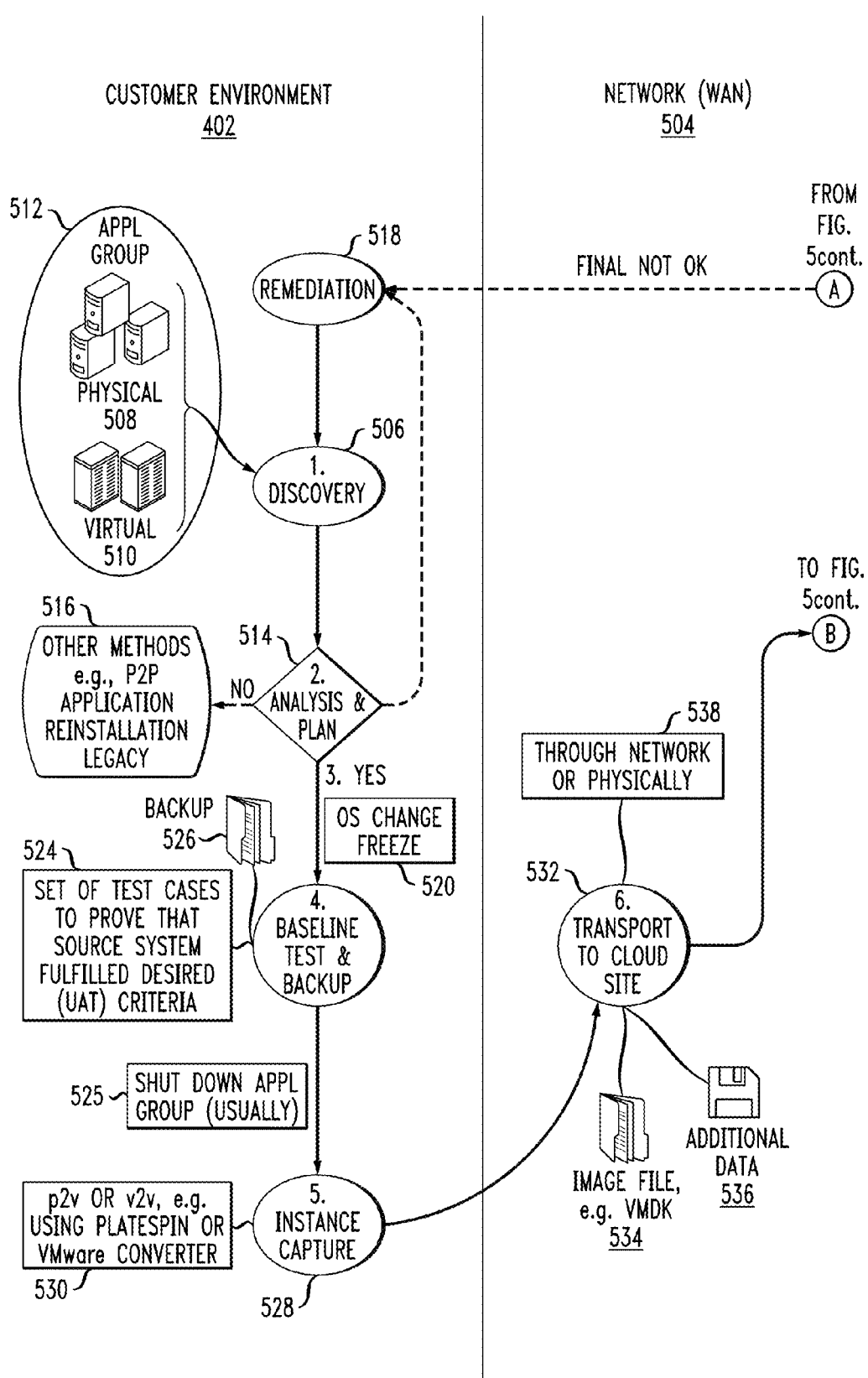
FIG. 5 presents a detailed flow chart and block diagram, according to an aspect of the invention.
Figure 5:
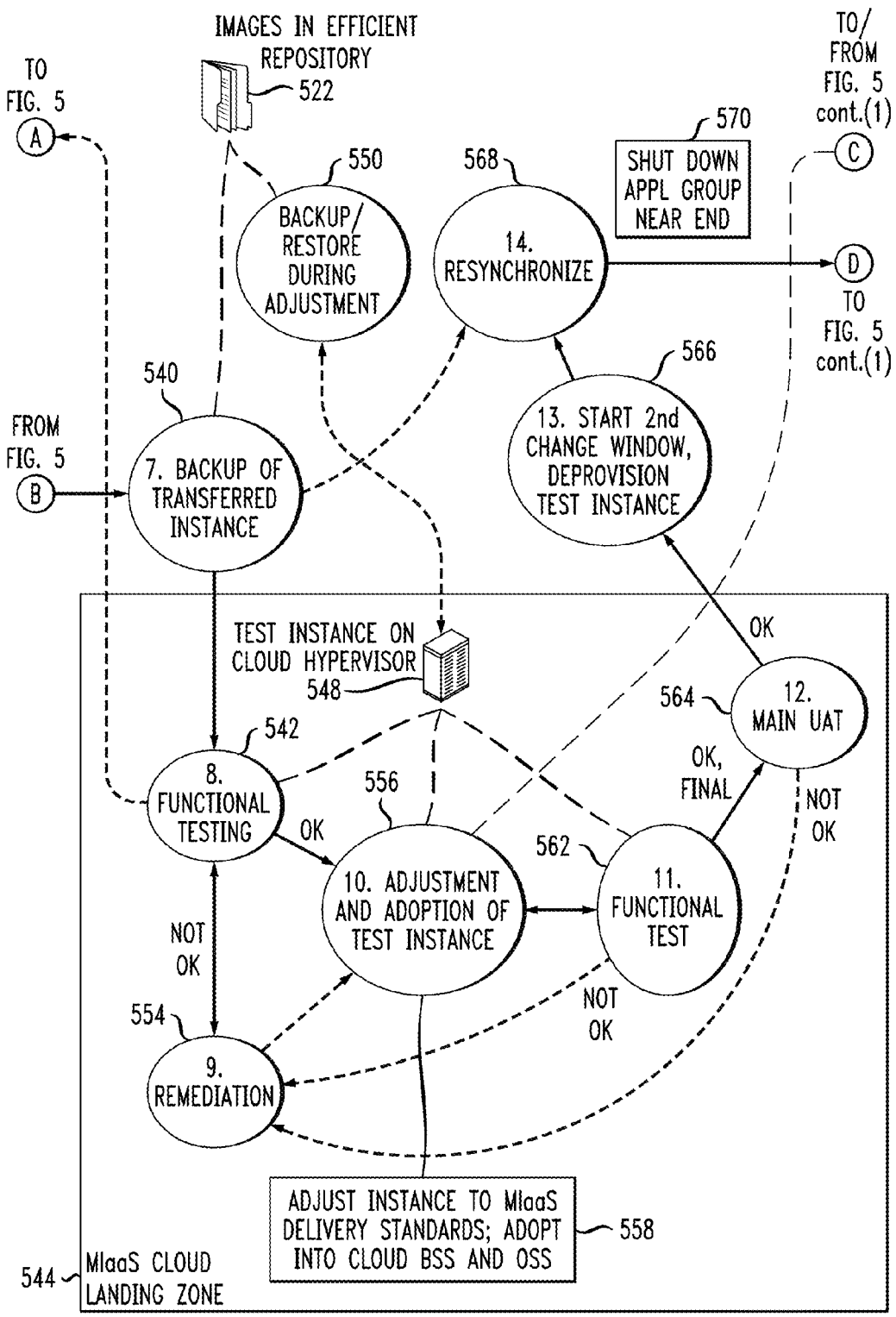

Turning now to FIG. 5, a non-limiting exemplary method is depicted therein with greater detail. A customer environment 402 is connected to an MIaaS cloud environment 502 via a wide area network (WAN) 504 or the like. Initially, a discovery process 506 is carried out to determine both the physical 508 and virtual 510 configuration of an application group 512 of the customer environment 402. Analysis and planning is then carried out in step 514. If the results are unfavorable, other methods, such as physical-to-physical (P2P) migration, application reinstallation, use of legacy systems, and the like are pursued, as shown at 516. Also, if step 514 indicates that remediation is required, the same is carried out at 518 and then process flow returns to step 506. On the other hand, if step 514 indicates that migration using one or more techniques disclosed herein is feasible, an operating system change freeze is implemented at 520, and then flow proceeds to baseline test and backup, in step 522. In step 522, as shown at 524, a set of test cases are run to prove that the source system fulfills desired user acceptance testing (UAT) criteria. Furthermore in this regard, heretofore, a "source instance" has been discussed; in the present example there are a group of source instances that together fulfill a function for users (can be considered in this example the same as "application group").

In addition, a back-up process is carried out, as shown at 526, to permit recovery in case of any issues encountered in the migration process. The application group 512, in some embodiments, is shut down after step 522 (start of first change window)(alternative is the "warm" P2V or snapshotting mentioned before), as shown at 521, before processing proceeds to step 528, wherein all instances to be migrated are captured ("captured" in this context corresponds to "P2V or snapshot" 404 in FIG. 4. In other words, "capture"=turn source instance into an image). As seen at 530, this instance capture step can include, for example, both physical-to-virtual (P2V) and virtual-to-virtual (V2V) techniques with one or more suitable tools. One non-limiting example of a suitable tool is PlateSpin® Migrate, a physical/virtual conversion tool for fast and efficient P2V (more broadly, anywhere-to-anywhere) migrations; it is available from NetIQ Corporation, Houston, Tex., USA. Another non-limiting example of a suitable tool is VMware® Converter, a tool to convert local and remote physical machines into virtual machines; it is available from VMware, Inc., Palo Alto, Calif., USA. In one or more non-limiting exemplary embodiments, the end result of step 528 is an image file such as a Virtual Machine Disk Format (VMDK) file, as at 534, or an Open Virtualization Format (OVF) package or an OVA file, which is an archive containing an OVF package. After the instances are captured in 528, the application group 512 is restarted (end of first change window) at 529, in one or more embodiments. That is to say, if the application group 512 was shut down in Step 521, then it should be restarted now, such that in the intermediate period, the application group still does production work.

It is to be emphasized that many product names are mentioned herein; these are intended as examples for the skilled artisan. They are not intended to limit the claims unless expressly recited therein, but rather are to be considered exemplary of corresponding generic software products; e.g., PlateSpin® Migrate and VMware® Converter are broadly representative of physical/virtual conversion tools.

As seen in step 532, the captured instances are then transported into the cloud location 502 via network 504 (or physically). The image file (e.g., vmdk file) 534 and additional data 536 are transported. As noted at 538, the instances 534 and data 536 are transported through network 504 using appropriate tools to control the transfer, or physically transported.

In step 540, two or more copies (e.g., a first copy and a second copy) of the transferred instance 534 are made. Copies of the transferred instance can be backed up in an efficient instance repository 552. The second copy will be used during resynchronization in step 568, described below. In step 542, functional testing is carried out on the first copy of the transported instance(s) to make sure that the transport 532 worked correctly. (Alternatively one can rely on checksums or the like that may be included in the transfer protocol.) Also, it should be noted that upon initial arrival in cloud environment 502, the transported instances reside within MIaaS cloud landing zone 544. If functional testing is successful, the first copy of the transported instance is instantiated on cloud hypervisor 548 within MIaaS cloud landing zone 544. In parallel, between individual adjustment steps and their tests 556 on the cloud hypervisor, instances can be backed up, as shown at step 550 (e.g., as vmdk files in the efficient instance repository 552). On the other hand, if functional testing is not successful, processing flow proceeds to remediation step 554. The remediation process can proceed via a number of avenues. The remediation process may return to step 542 for further functional testing.

If the functional testing is successful—the test instance (e.g., the first copy of the transferred instance that has been adjusted) is subjected to adjustment and adoption step 556 wherein test instances are, as explained at 558, adjusted to MIaaS delivery standards and adopted ("adoption" is analogous to adjustment and registration together—see step 410) into the cloud BSS and OSS 559, which resides within production zone 546. It is worth noting that, in essence, while only one "remediation" step 518 is shown and this step is reached from several tests, in reality the remediation depends on exactly which test failed and how far we were in the process (e.g., which adjustment was last made, and thus most likely caused the problem). Thus the remediation typically tries to repair that last step and then returns to that step or the next one in the process.

As seen at 560, the process of step 556 employs provisioning flows, extended by adjustment sub-flows. This ensures that the registration of migrated instances is correct and enables them to later be managed like provisioned instances. It is worth noting that at the end, the migrated instance must be registered in the cloud, in particular in its Configuration Management Database (CMDB—CMDBs are, in and of themselves, known to the skilled artisan), but there may be more management components that have databases about the servers managed (e.g., a billing system). During the adjustment and adoption of the test instance, the test instance remains instantiated on cloud hypervisor 548, but may be shut down and restarted one or more times. Additionally, after adjustment and adoption of the test instance, or even after individual adjustment steps, the test instance is subjected to more functional testing in step 562. If not successful, the method returns to remediation in step 554, which summarizes multiple remediation types depending on the last step executed in the main flow, which most likely caused the problem. If successful, the test instance is subjected to main user acceptance testing (UAT) in step 564, while still instantiated on cloud hypervisor 548. If the UAT is not successful, the method returns to remediation in step 554. If the UAT is successful, the second change window is started in step 566, and use of the test instance is deprovisioned or suspended. Then in 568, the second copy of the transferred instance is re-synchronized with the source instance of the application group 512.

Regarding the terminology "re-synchronized," the first synchronization is inside the transfer; one even speaks of "re-synchronize" if it's a pure one-step transfer (i.e., source is shut down, file is transferred) because at the end source and target are equal. But such a transfer can also work with first transferring the bulk of the data while keeping the source instance running and then already re-synchronizing, i.e., transferring only the data that changed during the transfer. As described above, during re-synchronization of the second copy with the source instance, the second copy is updated with the changes that have been made to the source instance since the transport 532, or more precisely the last re-synchronization that was performed as part of the transport 532. The resynchronized second instance, in some embodiments, is referred to as a "main instance." Associated with resynchronization of the second copy is the shutdown of the application group 512, as shown at 570.

In production zone 546, the main instance is subjected to adjustment and adoption step 572 (analogous to step 420—fast cloud adoption step of FIG. 4) wherein the adjustments made to the test instance (first copy) are made to the main instance, and the adjusted main instance is then adopted into the cloud BSS and OSS 559. User acceptance testing 574 (analogous to step 422) may be conducted, for example, to verify that performance is equivalent to a baseline, or that the application properly works together with other applications that are still in the customer environment 402. If not so, remediation is carried out at 576, to correct the errors. When testing 574 is successful, cut-over is carried out in step 578, taking into account any customer domain name server (DNS) changes or the like, as seen at 580. Upon completion of cut-over, as seen at 582, the migrated instances operate in the MIaaS cloud production zone in a business as usual (BAU) manner.

In one or more embodiments, the landing zone is a special zone added for migration, because when the instances are first started on a hypervisor in the cloud environment in order to test and adjust, they do not yet fulfill cloud standards and thus the normal cloud management cannot handle them. They may also not fulfill the security standards that the OS management in the cloud provides and assumes. For this reason, the landing zone and the production zone are physically separated in one or more embodiments, at least by using different servers to host the hypervisors, and separating them by firewalls that only let the controlled information through. In addition, the storage systems may be separate. Another advantage of physical separation is that the cloud management systems such as capacity and performance management then don't have to deal with hypervisor(s) that are partially filled with normal, managed cloud instances and partially with as yet unmanageable imported instances. However, it is also conceivable to use logical separation, i.e., trust the cloud hypervisors to not let the potentially insecure imported images impact the others, and to extend the cloud management systems to deal with partitioned hypervisors. Upon completion of cut-over, the migrated instances operate in the cloud production zone in a business as usual (BAU) manner.

In FIG. 5, it will be appreciated that in one or more exemplary embodiments, steps 518, 522, 564, 574, and 578 are in the scope of the customer while steps 506, 514, 516, 528, 532, 540, 550, 556, 562, 568, and 572 are in the scope of the cloud services provider. Steps 542, 554, 566 and 576 are of a mixed nature between both parties.

Figure 6:
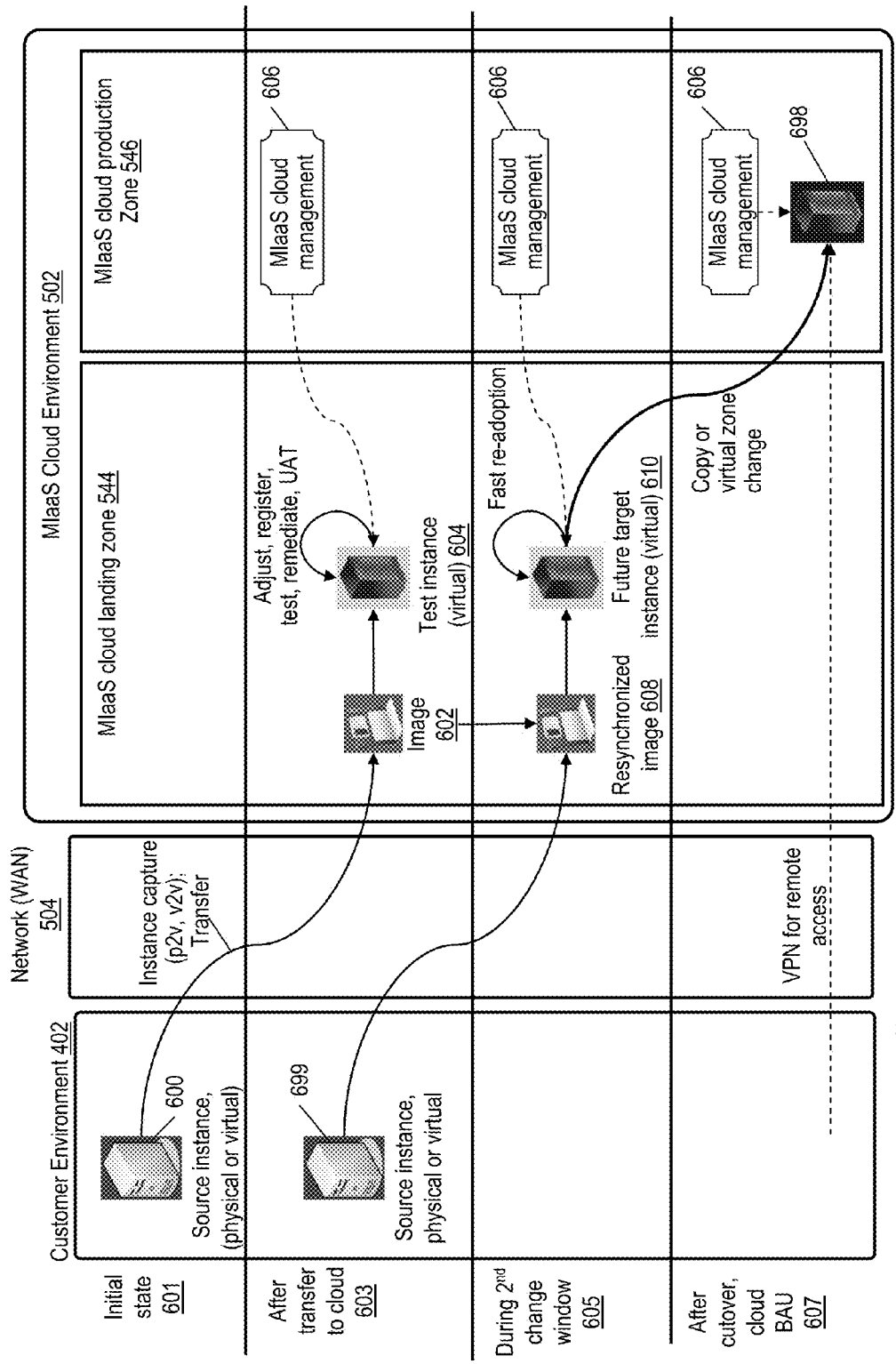
FIG. 6 presents an exemplary system block diagram, according to an aspect of the invention.

FIG. 6 shows system states at significant points in time (i.e., during significant phases); namely, initial state 601, after transfer 603, during second change window 605 and after cutover (cloud BAU) 607. Customer environment 402 includes one or more source instances 600 (same as 508, 510) to be transferred to the cloud. Network 504 provides connectivity between customer environment 402 and MIaaS cloud environment 502. Environment 502 includes landing zone 544 and production zone 546. In the initial state, the source instance 600 resides in the customer environment 402. After the instance has been captured, as described above with respect to FIG. 5, during a first change window, in some embodiments, the virtual image 602 is transferred to the landing zone 544. After the image 602 has been transferred to the landing zone 544, the source instance 600, now labeled as 699, is again functional at the customer environment 402. One copy of the image 602 is used as a test instance (virtual) 604, and is subjected to adjustments, registration, testing, remediation and UAT, as described above with respect to FIG. 5. Cloud management functionality 606 resides within the cloud production zone 546, and accesses test instances (virtual) 604.

In one or more embodiments, a second copy of the image 602 is made after transfer to the cloud landing zone 544, and during a second change window, the second copy is resynchronized with the source instance 600, resulting in a resynchronized image 608, as described above with respect to FIG. 5. The resynchronized image 608 is subjected to the adjustments made to the first copy 604, resulting in a future target instance (virtual) 610. In one or more embodiments, the adjustments to the resynchronized image 608 are applied during a process called "fast re-adoption" analogous to steps 420 and 572, and essentially the same as the "fast cloud adoption" discussed elsewhere. Cloud management zone 606 accesses the future target instance 610. The future target instance 610 is copied to the production zone 546 for BAU or else a virtual zone change is carried out for BAU; i.e., logical separation is used as described above and the instance is only placed in a different virtual LAN (VLAN) that is in the production zone. It should be noted that in some instances, a specific landing zone is not used. After the target instance 610 has been cut over to the production zone 546, it is under the control of the cloud management 606, the source instance 600 in the customer environment 402 is no longer used and/or is deactivated, and the customer remotely accesses (e.g., via VPN) the target instance 600, now labeled as 698, in the production zone 546.

Please note that in FIG. 6, instances 600, 699 represent in-use customer instances; element 698 is an in-use instance in the cloud; and instances 604, 610 are non-production instances.

Figure 7:
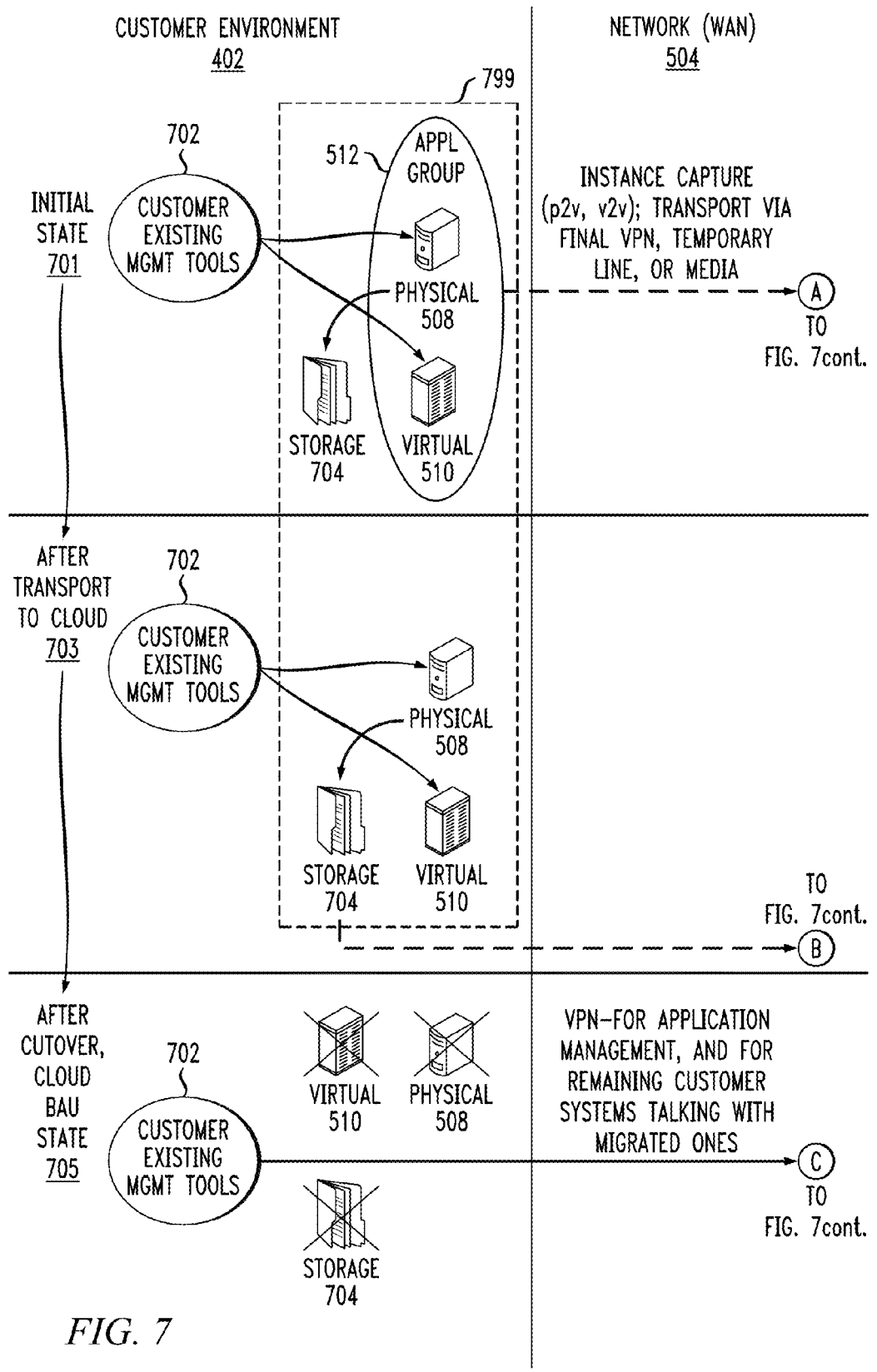
FIG. 7 presents an exemplary system diagram including system states at significant phases, according to an aspect of the invention.
Figure 7:
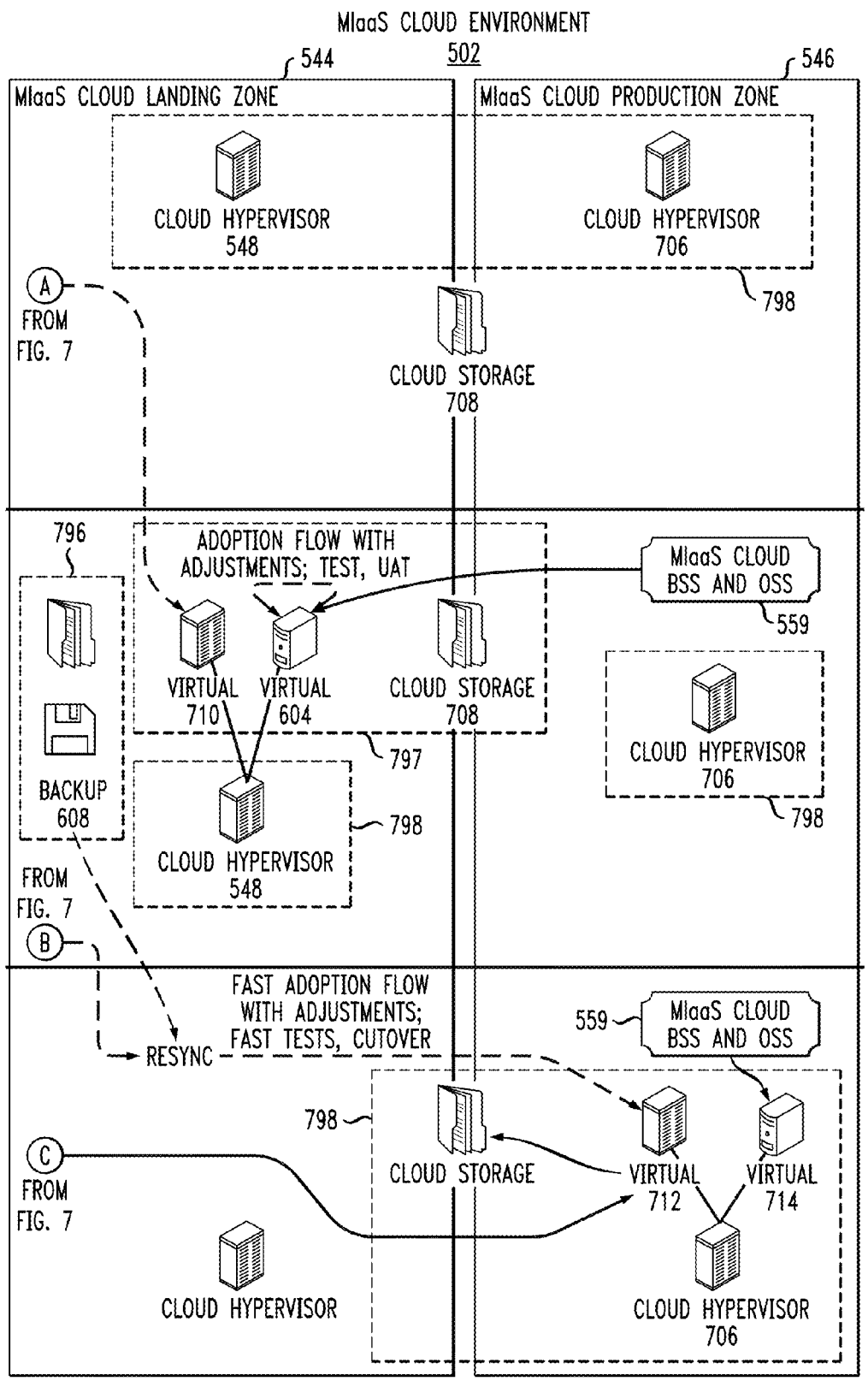

FIG. 7 shows system states at significant points in time (i.e., during significant phases); namely, initial state 701, after transport to cloud 703, and after cutover (cloud BAU) 705; these correspond to 601, 603, 607. In state 701, the customer's existing management tools 702 manage both the physical 508 and virtual 510 source instances of the customer environment 402. The same are stored in customer storage 704 (and additionally they may have backups as described with respect to backup step 522 and 526). The instances are captured, in one or more embodiments, during a first change window. As discussed above with regard to 530, this instance capture can include, for example, both physical-to-virtual (P2V) and virtual-to-virtual (V2V) techniques with one or more suitable tools; transport can be via WAN 504 (which could include, for example, the final virtual private network (VPN) (used for communication between the customer and cloud environment during normal operation after migration is complete)), or a temporary line, or by transfer of physical media. Cloud environment 502 includes cloud provider hardware and hypervisor 548 in cloud landing zone 544, cloud provider hardware and hypervisor 706 in cloud production zone 546, and cloud storage 708. The hypervisor 706 would be located in production zone 546 in FIG. 5, and the "main instance" (second copy) would run on it; however, it is omitted from FIG. 5 to avoid clutter.

After transport, as seen at 703, physical and virtual instances 508, 510 are now both virtualized on cloud provider hardware and hypervisor 548, as seen at 710. The first copy 604 of the virtualized aspects is made in this stage. The first copy or test instance 604 is subject to adoption flow with adjustments, tests, and UAT, as described above. Migrated data is stored in shared storage 708. The adjustments are related to the BSS and OSS of the MIaaS cloud 559, i.e., successively make the test instance manageable by these BSS and OSS. A second copy 608 (e.g., backup) of the transferred image is also made during this stage 703. During this stage, 703, the customer's existing management tools 702 (physical and virtual aspects 508, 510) operate normally on the source instance, which still runs in production, while waiting for successful cutover.

After the transport to cloud stage 703, but before the after-cutover, cloud BAU stage 705, the second change window is started. Note that in FIG. 6 we had introduced a phase 605 for this; this is omitted from FIG. 7 to avoid clutter—however, all the objects in 796-798 nevertheless remain. During the second change window, the second copy 608 is resynchronized with the physical or virtual source instance 508, 510 in the customer environment 402 to update the second copy 608 with any changes made to the physical or virtual source instance 508, 510 between the end of the first change window and the start of the second change window. The resynchronized second copy 608 is subject to the adjustments made to the first copy 604, and then cutover to the production zone 546. In one or more embodiments, the adjustments are made during a fast adoption flow process, and include fast tests. After cutover, in the cloud BAU state, as indicated at 705, the physical or virtual source instance and its storage resources 508, 510 and 704 in the customer environment 402 are shut down. Meanwhile, physical or virtual instance 508, 510 is now virtualized on cloud provider hardware and hypervisor 706, as seen at 712 and 714, respectively. Migrated data is still stored in cloud storage 708. BAU cloud processing occurs under control of cloud OSS and BSS systems (Operation and Business Support Systems) seen at 559. The customer management tools 702 that are still needed (e.g., to manage an application that is running on top of the migrated instance) are provided with an interface to production zone 546.

In FIG. 7, elements within dashed border 799 are in-use customer instances; elements within dashed borders 798 are in-use infrastructure and instances in the cloud (in the upper 798 (in state 701) there is no instance yet on those hypervisors, at least not any copy of the instance(s) we are currently migrating); and elements within dashed border 797 are test instances. Elements 702 are in customer scope, while elements within dashed border 796 are in migration team scope.

In one or more embodiments, if it is reliably known in advance that the source instance has a boot drive and a data drive (or several), that there is a change freeze in place during which only the data drive will be changed, and that adjustments are only planned on the boot drive and can be performed without the data drive, then two copies of the source instance and resynchronization are not needed. In this example, there is still the instance capture (P2V, V2V) step in the first change window, but only the boot drive image is transferred. Also, once the adjustments on the boot drive are finished, the data drive is transferred (this may start with a standard resynchronizing transfer tool in advance). Then the adjusted boot drive is united with the data drive and finally cut-over is made to this target version.

In one or more embodiments, back-out decisions and change windows concern the entire enterprise application, not only individual instances.

In one or more embodiments, if there is a zone adjacent ("adjacent zone") to the cloud where captured and transferred instances can be run in production, then between the two change windows, the production workload can already be run in that zone. However, this may, in some embodiments, involve the application owners (customers) performing two user acceptance tests and two cutovers—one for each of the adjacent zone and the final production zone (because each time the production instance changes, they may want to test first). Further, if the adjacent zone exists, and an image was already virtual or P2Vable (capable of physical-to-virtual transformation), but the minimum required adjustments do not work, the image can be run in the adjacent zone in production, irrespective of whether the image was run on the source side or already in the adjustment zone during adjustment attempts.

Turning now in more specific detail to the addresses used during user acceptance testing (UAT) of the test instances, one or more embodiments provide for the avoidance of address confusion during the state where the test instance is in UAT while the source instance is still in production, e.g. step 564. Addressing can occur by internet protocol (IP) addresses or host names. Host names are typically resolved into IP addresses by domain name service (DNS), but can also be resolved by a local host file. Typically, local host files are checked before remote services are called, but depending on the operating system, this can be configurable. The host file can be in a fixed place per operating system, or there may be a fixed configuration parameter that indicates its location. In the following 3 cases, other server-based name resolution (e.g., WINS) is omitted, as it can be treated similar to DNS.
Case 1—IP Addresses and DNS Names Change in the Migration In one or more embodiments, in this case, all of the addresses of the test system are new, and are non-overlapping with the source production system (e.g., they may change from a customer address range to a service provider name range, or change with locations.) As such, the two systems are used in parallel.
Case 2—IP Addresses Change in the Migration, DNS Names Remain In this case, the use of IP addresses in UAT is unproblematic because those of the test systems are new and non-overlapping with the source production system. Additionally, the customer tester is asked, in one or more embodiments, to use an IP address directly in the customer's test (e.g., in a URL needed to access a web frontend of the application). However, the components of the enterprise application being tested may address each other by host names (this is quite typical, independent of the case—however, in Case 1 it wasn't a special problem). If the components use local host files, the local host files are naturally adapted as part of the migration, and this should already be functional in UAT. However, if the components use DNS, in one or more embodiments, the real DNS cannot be changed at this point.

One solution provided by one or more embodiments is to temporarily add the DNS names and new IP addresses of all the currently moving servers into the local host files of all of the currently moving servers, at least if the configuration is such that local host files are used before DNS. To ensure that the test instances make no updates on any production systems (e.g., on central servers that don't move at present), the production system DNS can be un-configured in the test instance. However, it should be noted that if the production system DNS is un-configured, a test would also fail if the test instances only perform reads on non-migrating services (such as a general personnel or customer database).

Figure 8:
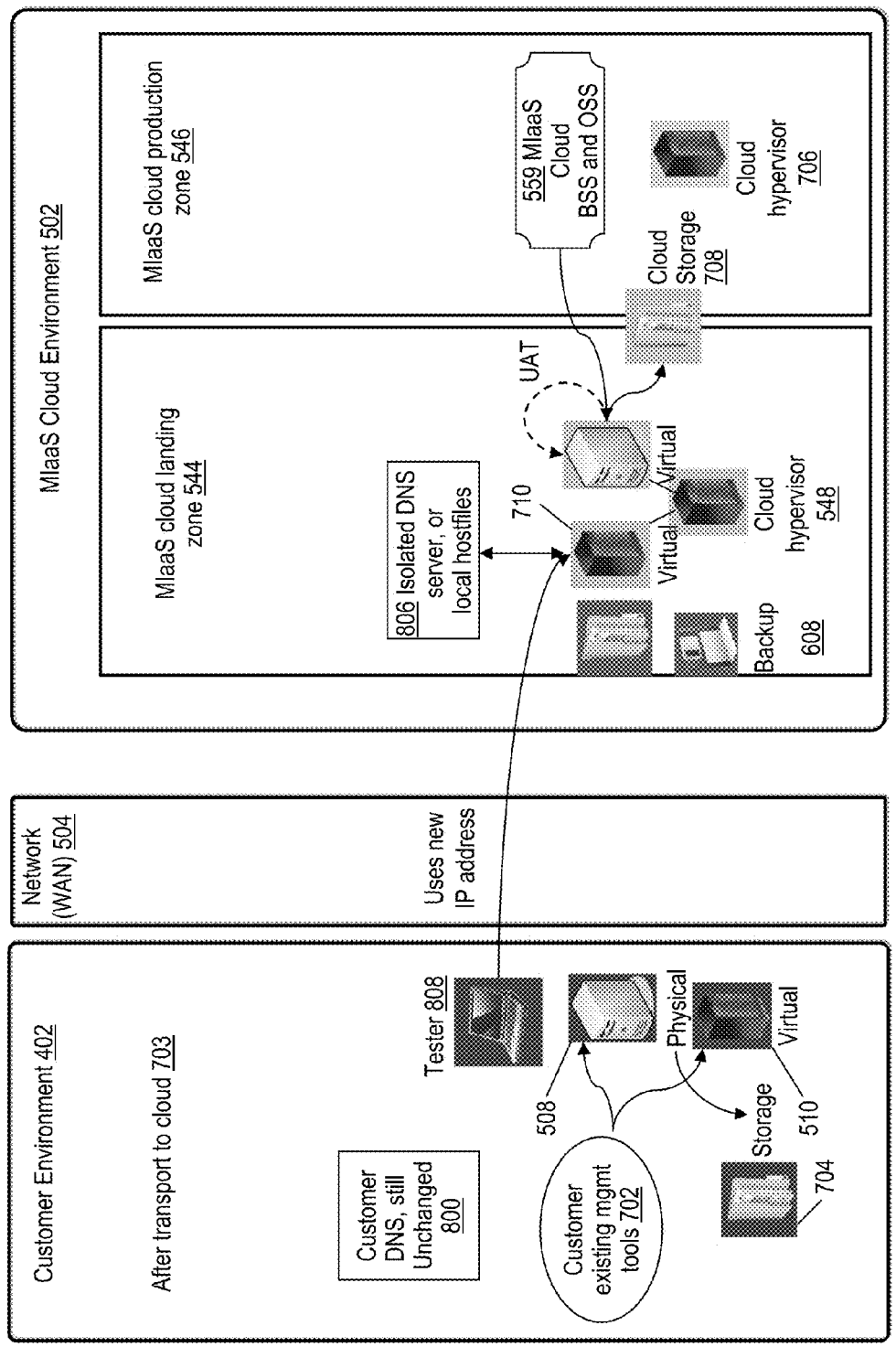
FIG. 8 presents an exemplary system block diagram for a user acceptance test state, according to an aspect of the invention.

Another solution provided by one or more embodiments is shown in FIG. 8, which shows the system state of "after transport to the cloud" (e.g., 703). The Customer DNS 800 remains unchanged after the source instance is transferred to the cloud. The test instance 710 created from the transferred image already has the new IP address that it gets in the cloud. In this solution, a special test DNS server 806 is used and the test instances are configured to use that server instead of the final one. Additionally, the test instances are given new IP addresses by the tester 808 during UAT. On the test DNS server 806, the new addresses of the test instances are added under the (not changing) DNS names, as well as the addresses of any other services that the test instances are allowed to use, such as the general personnel or customer database mentioned above.
Case 3—IP Addresses and DNS Names Remain In this case, all addresses overlap between the test instances and the source production system.

In one or more embodiments, one option is to change the IP addresses just for the test, and thus to go back to Case 2. This change would not be repeated in the final faster adoption flow process, described above, in the second change window, but the correct working of the old addresses is ensured by their production use.

In some embodiments, another option is to isolate the test system (i.e., not to route traffic between it and any other systems). In some instances, this isolation is easier to set up than special IP test addresses, if the environment allows it. In some instances, clouds may not allow isolation, as routing is an infrastructure function that may not be changeable by the migration team. For the actual customer tester, who in some instances is not local in the test environment, at least one route into the test environment is needed (e.g., via a network address translation (NAT) router that changes some special test IP address(es) used by the tester to the IP address(es) used in the test system). If the test system is supposed to have access to an external system (typically only advisable if such access is read-only access), outgoing connections to specific addresses can be specifically enabled.

Turning now in more specific detail to the logging and reapplying of the adjustments aspect, in some embodiments, during the work on the test instance, the adjustments and remediations performed are logged so that they can be applied quickly on the final instance (e.g., resynchronized copy) in the second change window. In some embodiments, typically there will be a detailed initial adjustment plan for the instance (i.e., what needs to be done to the instance, based on earlier discovery on the source instance and the cloud standards. If this is not already done, creation of this plan becomes part of the logging process, in some embodiments). The following cases describe different plan scenarios.

Case 1—Automation with No Problems

If the plan is fully automated, and runs through without problems (e.g. no error messages from the automation scripts, all functional tests succeed, and no remediations are needed, and the UAT succeeds, then the same plan is simply reused in the second execution (i.e., on the final instance (resynchronized second copy of the source instance)).

Case 2—Manual Steps, No Problems

If the plan contains manual steps, and those contain lookups, and/or decisions to be made by the human, etc., then those should be filled into the plan in the first execution (e.g., with the first copy), and be taken for granted in the second execution (e.g., with the resynchronized second copy). For example, the plan is a spreadsheet with steps in rows, and with one or more columns for such parameters that the human executor chooses. Then the parameters chosen in the first execution should be retained in the spreadsheet for the second execution. If the plan branches in complex ways (e.g., "IF x THEN continue in row 50"), in some embodiments, the plan is simplified for the second execution by retaining only the branches chosen in the first execution. Similarly, parameters used multiple times might already be substituted in all places. In some embodiments, the shorter the second change window is, the more beneficial it is to fill in the manual steps in the first execution and take the decisions for granted in the second execution. In some embodiments, the plan is available in a web interface, and in each step with such choices, there is a field for the human executor to fill-in. Depending on the underlying workflow support engine, branches with pre-filled decisions are then taken automatically in the second run (e.g., with the resynchronized second copy), in some embodiments.

Case 3—Problem Remediation in the Test Run

If there are problems during the first execution (e.g., with the first copy), and they are solved, then the problem solution becomes part of the modified plan for the second execution (e.g., with the resynchronized second copy), in some embodiments.

In some instances, if something was wrong in the automated part (e.g., a parameter is to be changed in a certain file during an adjustment, but on this source instance the file is in a different location), the automated part should be changed. In some embodiments, the automated part is changed just for this instance (e.g., by hard-coding the new file location), or for the future (e.g., by encoding to first look for the file in the original location, then in the second location now found).

In some instances, if something was remediated manually, it can also be done manually in the second execution (i.e., add it to the manual part of the plan). In some embodiments, this can be done only for this one time, (e.g., with a fixed new row of what to do), or generally (e.g., with an IF-THEN-ELSE statement), or both, with a short specific plan for the second execution, and extending the default plan for subsequent instances.

In some instances, the remediation is automated for the future; in particular, if there is a clear criterion under which an additional step has to take place. In this instance, in some embodiments, the new automation is tested on the test instance before applying it to the final version. If the automation is to become part of the standard plan, in some embodiments, it is tested on some other generic test servers, to ensure it does not introduce problems in cases for which the original plan and automation worked. For example, if one decides to move a file or surrounding directory from a custom place to its default place, this can be automated if there is a clear way of finding the custom place of that file, checking that there is no conflict in the default place, and updating the configurations or paths on the source instance that might point to the custom place of the file.

Given the discussion thus far, it will be appreciated that, in general terms, an exemplary method, according to an aspect of the invention, includes the step of preparing an image version 602 of a source instance 600. A further step includes transferring the image version of the source instance to a destination environment 502. A still further step includes creating two or more copies of the transferred image version of the source instance at the destination environment (e.g., 604 and the one which results in resynchronized image 608 as discussed above). Additional steps include adjusting the first copy 604 of the transferred image version of the source instance while the source instance is in use; and resynchronizing the second copy of the transferred image version of the source instance with one or more changes made to the source instance, to obtain resynchronized image 608. Another step includes applying the adjustments made to the first copy of the source instance to the resynchronized second copy of the source instance—as discussed above, the resynchronized image 608 is subjected to the adjustments made to the first copy 604, resulting in a future target instance (virtual) 610.

Consider what would happen in a situation where there is a conflict between the adjustments made to the first copy and the synchronizations made to the second copy. It is for this reason that one has to reapply changes and can't simply merge them. "Applying" means executing some code (or manual task). It may sometimes do something slightly different the second time. For example, if an adjustment is to delete a log file from an old monitoring agent (because in the cloud another monitoring agent is used), the log file will have gotten longer on the source instance in the meantime, but the command "delete log file X" will still succeed. Cases where the changes on the source instance at this time really prevent the adjustments from succeeding the second time should be extremely rare—in particular as there is typically a "change freeze" around the entire period, which means people should no longer install new software or change their operating system, only do their normal business work with the server.

In some instances, a further step includes providing a first change window as discussed at 404, wherein preparing the image version of the source instance occurs during the first change window. In some such instances, a further step includes providing a second change window as at 416, wherein applying the adjustments made to the first copy of the source instance to the resynchronized second copy of the source instance 420 occurs during the second change window.

In some such instances, resynchronizing one or more changes made to the source instance with the second copy of the transferred image version of the source instance further includes updating the second copy of the transferred image version of the source instance with changes that the source instance users made between the opening of the first change window and the opening of the second change window. In this regard, usually (unless one uses the "warm" P2V etc.) they can't make any changes during the first change window because the source instance is shut down during it, but both cases are possible.

In some embodiments, further steps include, as at 410, adjusting the first copy of the source instance while the source instance is in use during the first change window; and deciding to cut-over (as in step 578) to the adjusted first copy if the adjustments to the first copy are completed during the first change window. Refer to the above discussion of the case where, if the first change window is relatively large (e.g., an entire weekend), where P2V is complete before the end of the first change window, and the cloud adoption test is ready and successful (i.e., no remediation needed) with enough time before the end of the first change window, the entire migration can be completed in the first change window.

In some cases, a further step includes determining whether to carry out the preparing, transferring, creating, adjusting, resynchronizing, and applying steps, based on (e.g., predicted or estimated) transfer time, (e.g., predicted or estimated) adjustment time, and available change window length. In some such cases, the determining further includes determining whether the source instance has a known separation of an operating system and other data (see, e.g., above discussion of boot drive and data drive case). Different directories on the same drive are another example of known separation.

In some such cases, further steps include, if the source instance has a simple separation of the operating system and other data, requiring a change freeze on the operating system (as at 520) during the preparing and adjustment steps; applying the resynchronizing step only to the other data; and omitting the applying step (then also a second copy is not really needed). As used herein, a "change freeze" is a time period in which the users (including administrators) are not allowed to change anything on the operating system (such as installing new software, different security settings, installing new users) but business applications can still run on the instance. Typically in a migration one starts a change freeze quite early (even before the last time one does discovery 506 so that the discovery remains correct) and only closes it after cut-over—except of course for all the changes that the migration itself incurs.

In some cases, adjusting the first copy of the source instance while the source instance is in use further includes adjusting the first copy of the source instance to conform to a specification of the destination environment; and testing the adjustments made to the first copy of the source instance. See, e.g., steps 556, 558, 562. In some such cases, the adjustments made to the first copy of the source instance further include remediation on an application layer of the first copy of the source instance. Although the term "remediation" has generally been used herein for all layers, i.e., everything that needs fixing, remediation could also be on the OS layer—for example, if an old patching agent should be uninstalled but is in such a strange place that the automation can't find it.

As an aside, it is worth noting that a "host" is typically understand as a server. A server is only a part of a cloud, and not the part that determines the standards most. OSS and BSS also belong to the cloud. A "destination environment" includes clouds and other IT standards.

In some cases, preparing the image version of the source instance further includes transforming a physical embodiment of the source instance into a virtual embodiment of the source instance (see, e.g., FIG. 6 elements 600, 602).

Some embodiments further include adjusting the transferred image version of the source instance and/or a running instance of the transferred image version of the source image to conform to a destination environment specification. Refer to the above discussion of the case where the method includes transfer of the instance to the cloud in image form; adjustments of the instance (running or in image form) to cloud standards; and registration of the instance into cloud OSS and BSS systems (Operation and Business Support Systems). Furthermore in this regard, in one or more embodiments, all actions are carried out on the first copy. Some changes can/should be done while the first copy is in image form, i.e., a file 602, in particular changing the IP address if that's required for the cloud, because with the wrong IP address, it cannot be reached in the cloud from the network. The skilled artisan will be familiar with US Patent Publication 2014-0149492 of Ananthanarayanan et al., the complete disclosure of which is nevertheless expressly incorporated herein by reference in its entirety for all purposes. Other, and often most, changes are done while it has been instantiated to run on a hypervisor, like 604/710 on 548.

In some cases, a further step includes maintaining use of the source instance while the image version of the source instance is transferred.

In some cases, a further step includes maintaining use of the source instance while the image version of the source instance is being prepared.

In some cases, further steps include creating a third copy of the transferred image version of the source instance; and using the third copy of the transferred image version of the source instance after the transferring step, instead of the source instance. Refer to above discussion of case where a third copy of the source instance is made at the cloud site, and this third copy is, after minimal testing, available to run in the production zone at the cloud site and to replace the source instance (i.e., cut-over), but not inside the MIaaS part. This is also briefly referred to as "use"—i.e., "use" means by end users, not by a migration team.

In some embodiments, in the transferring step, the destination environment is a managed-infrastructure-as-a-service (MIaaS) cloud 502.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments are particularly significant in the context of a cloud or virtual machine environment, although this is exemplary and non-limiting. Reference is made back to FIGS. 1-3 and accompanying text.

As noted elsewhere herein, computer program code for carrying out operations for aspects of the present invention may be written in any combination of one or more programming languages, including an object oriented programming language such as Smalltalk, C++ or the like and conventional procedural programming languages, such as the "C" programming language or similar programming languages. In the most general case, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). However, one or more embodiments are particularly significant in the context of a cloud or virtual machine environment. Reference is made back to FIGS. 1-3 and accompanying text. In one or more embodiments, most of the automation will run in the cloud. There is typically a workflow engine that orchestrates the steps (such as the various adjustments and tests). This would be seen as part of the cloud BSS and OSS (mostly OSS). Within that, it can be a separate migration orchestration engine or the engine that also orchestrates other tasks such as provisioning. Certain steps in the migration workflow interact with the instance (first or second) that is being migrated, in particular during the adjustment step. For example, the workflow engine may send scripts or installers to that instance and cause them to be executed, e.g., a script that changes security settings, and an installer for a monitoring agent that is used as part of "Managing" in the MIaaS cloud. Other steps of the migration workflow may interact with other BSS and OSS systems, e.g., to register the new monitoring agent in a central monitoring server The workflow engine will typically have a human interface. That may be a web-based or fat-client interface that a user (migration engineer) can use from his or her "user's computer." Also, the testers may have some of that interface (like to trigger test steps) as well as the interface of the application itself that they test. For example, a tester for a Lotus Notes application may use his or her Lotus Notes client in testing.

It should be noted that any of the methods described herein can include an additional step of providing a system comprising distinct software modules embodied on a computer readable storage medium; the modules can include, for example, any or all of the appropriate elements depicted in the block diagrams in any of the pertinent figures and/or described herein; by way of example and not limitation, any one, some or all of the modules/blocks and/or sub-modules/sub-blocks in FIGS. 4 and 5. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. Also the workflow engine etc. in the cloud ultimately have software modules that get loaded onto them at some point (e.g., when the cloud is started, or upgraded).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   preparing an image version of a source instance;
   transferring the image version of the source instance to a destination environment;
   creating two or more copies of the transferred image version of the source instance at the destination environment;
   adjusting the first copy of the transferred image version of the source instance while the source instance is in use;
   resynchronizing the second copy of the transferred image version of the source instance with one or more changes made to the source instance;
   applying the adjustments made to the first copy of the source instance to the resynchronized second copy of the source instance;
   providing a first change window, wherein preparing the image version of the source instance occurs during the first change window; and
   providing a second change window, wherein applying the adjustments made to the first copy of the source instance to the resynchronized second copy of the source instance occurs during the second change window.

2. The method of claim 1, wherein resynchronizing one or more changes made to the source instance with the second copy of the transferred image version of the source instance further comprises:
   updating the second copy of the transferred image version of the source instance with changes that the source instance users made between the opening of the first change window and the opening of the second change window.

3. A method comprising:
   preparing an image version of a source instance;
   transferring the image version of the source instance to a destination environment;
   creating two or more copies of the transferred image version of the source instance at the destination environment;
   adjusting the first copy of the transferred image version of the source instance while the source instance is in use;
   resynchronizing the second copy of the transferred image version of the source instance with one or more changes made to the source instance;
   applying the adjustments made to the first copy of the source instance to the resynchronized second copy of the source instance; and
   determining whether to carry out said preparing, transferring, creating, adjusting, resynchronizing, and applying steps, based on, transfer time adjustment time, and available change window length.

4. The method of claim 3, wherein the determining further comprises:
   determining whether the source instance has a known separation of an operating system and other data.

5. The method of claim 4, further comprising, if the source instance has a simple separation of the operating system and other data:
   requiring a change freeze on the operating system during the preparing and adjustment steps;
   applying the resynchronizing step only to the other data; and
   omitting the applying step.

6. An apparatus comprising:
   a memory; and
   at least one processor, coupled to said memory, said at least one processor being operative to:
      prepare an image version of a source instance;
      transfer the image version of the source instance to a destination environment;
      create two or more copies of the transferred image version of the source instance at the destination environment;
      adjust the first copy of the transferred image version of the source instance while the source instance is in use;
      resynchronize the second copy of the transferred image version of the source instance with one or more changes made to the source instance; and
      apply the adjustments made to the first copy of the source instance to the resynchronized second copy of the source instance;
   wherein said at least one processor is further operative to provide a first change window, wherein preparing the image version of the source instance occurs during the first change window; and
   wherein said at least one processor is further operative to provide a second change window, wherein applying the adjustments made to the first copy of the source instance to the resynchronized second copy of the source instance occurs during the second change window.

* * * * *